United States Patent
Blake et al.

(10) Patent No.: US 10,287,780 B1
(45) Date of Patent: May 14, 2019

(54) SYSTEM AND METHOD FOR A BONDED LAYER FLOORING COMPONENT

(71) Applicant: Next Dimension Components, Inc., Jefferson, OH (US)

(72) Inventors: Rhine J. Blake, Boonville, IN (US); Matthew H. Russell, Bay Village, OH (US)

(73) Assignee: Next Dimension Components, Inc., Jefferson, OH (US)

( * ) Notice: Subject to any disclaimer, the term of this patent is extended or adjusted under 35 U.S.C. 154(b) by 0 days.

(21) Appl. No.: 15/985,043

(22) Filed: May 21, 2018

Related U.S. Application Data

(63) Continuation of application No. 15/790,554, filed on Oct. 23, 2017.

(51) Int. Cl.
| | |
|---|---|
| *B32B 3/10* | (2006.01) |
| *E04F 15/10* | (2006.01) |
| *B32B 7/12* | (2006.01) |
| *B32B 37/12* | (2006.01) |

(52) U.S. Cl.
CPC .............. *E04F 15/102* (2013.01); *B32B 7/12* (2013.01); *B32B 37/12* (2013.01); *E04F 15/107* (2013.01); *B32B 2419/04* (2013.01)

(58) Field of Classification Search
None
See application file for complete search history.

(56) References Cited

U.S. PATENT DOCUMENTS

| | | | |
|---|---|---|---|
| 4,122,224 A | 10/1978 | Brewer | |
| 2012/0077890 A1* | 3/2012 | Mancosh | C04B 16/06 521/68 |
| 2014/0198168 A1* | 7/2014 | Pervan | B41J 3/28 347/110 |
| 2017/0144409 A1 | 5/2017 | Ting | |

FOREIGN PATENT DOCUMENTS

| | | |
|---|---|---|
| CN | 106223569 A | 12/2016 |
| KR | 10-0-473618 B1 | 6/2002 |

* cited by examiner

*Primary Examiner* — Christopher M Polley
(74) *Attorney, Agent, or Firm* — BakerHostetler

(57) ABSTRACT

A system for manufacturing a luxury vinyl tile. The system includes a heater, a belt, and a wrapping machine. The heater is configured to heat a base layer of the luxury vinyl tile. The belt is configured to support and transfer the base layer through the system. The wrapping machine is configured to receive the base layer on the belt therethrough. The wrapping machine includes an adhesive dispenser and a series of rollers. The adhesive dispenser is configured to apply an adhesive onto a top surface of the base layer as the base layer travels through the wrapping machine. The series of rollers is configured to apply a decorative layer on top of the adhesive to bond the decorative layer to the top surface of the base layer.

5 Claims, 19 Drawing Sheets

SYSTEM AND METHOD FOR A BONDED LAYER FLOORING COMPONENT

CROSS-REFERENCE TO RELATED APPLICATIONS

This patent application claims priority to and is a continuation of U.S. application Ser. No. 15/790,554, filed Oct. 23, 2017, and which is incorporated herein by reference in its entirety.

TECHNICAL FIELD

The present invention relates to a flooring component, and more particularly, to a flooring component having multiple layers bonded together, and to methods and systems for manufacturing the flooring component.

BACKGROUND

In the flooring industry, a wide variety of flooring products are available including, for example, hardwood, bamboo, laminate, and luxury vinyl tile. Luxury vinyl tile typically includes a base layer or core that is formed from a polyvinyl chloride (PVC) material. A decorative layer is applied to the core using a thermofusing process to adhere the decorative layer to the core with a hot melt adhesive. The thermofusing process requires that the core be heated to a temperature of about 350 degrees Fahrenheit or greater to soften the PVC material and hot melt adhesive sufficiently to adhere the decorative later to the core. The heat required to adhere the materials of the core and the decorative layer can cause surface defects or variations in the thickness of the materials, which is often referred to as potato-chipping.

Additionally, forming the decorative layer is a time consuming and expensive process that includes embossing decorative patterns into the decorative layer using an embossing cylinder. The cylinder applies material to a sheet product that is typically 4 feet by 8 feet. As a result, the cylinder is made of sufficient width and diameter to apply a pattern on each sheet through a single revolution. For complex patterns, multiple cylinders are used to layer the embossings to form the desired pattern. Machining one or more cylinders to emboss a pattern on a decorative layer is expensive and requires significant time. To justify the time and cost involved in forming the cylinder requires a significant quantity of product to be produced. This creates a challenge when manufacturing flooring because the popularity of a pattern is subject to present consumer demand, and trends in the market. Often, large quantities of material that contain unpopular or outdated patterns are sold below cost or scrapped resulting in considerable waste.

Therefore, there is a need for a flooring component and a process for forming the flooring component that provides greater design flexibility by removing the need for an embossing cylinder.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

The present disclosure provides a flooring component, such as a plank or strip that is interconnected with other components to provide a floor covering, and a process for manufacturing the flooring component. The flooring component includes a core and a decorative layer that is attached to the core. The decorative layer is attached to the core at relatively low temperatures, and by using a series of rollers to form the flooring component.

An aspect of the present disclosure provides a flooring component (e.g. luxury vinyl tile). The luxury vinyl tile includes a base layer that is treated with a primer, a first adhesive that is applied onto a top surface of the base layer, a decorative layer that is applied on top of the first adhesive, a second adhesive that is applied onto a top surface of the decorative layer, and a wear layer that is applied on top of the second adhesive.

Another aspect of the present disclosure provides a system for manufacturing a luxury vinyl tile. The system includes a heater, a belt, and a wrapping machine. The heater is configured to heat a base layer of the luxury vinyl tile. The belt is configured to support and transfer the base layer through the system. The wrapping machine is configured to receive the base layer on the belt therethrough. The wrapping machine includes an adhesive dispenser and a series of rollers. The adhesive dispenser is configured to apply an adhesive onto a top surface of the base layer as the base layer travels through the wrapping machine. The series of rollers is configured to apply a decorative layer on top of the adhesive to bond the decorative layer to the top surface of the base layer.

Another aspect of the present disclosure provides a method of forming a flooring component. The method comprises: treating a base layer with a primer, heating the base layer such that a surface tension of the base layer is increased, applying an adhesive onto a top surface of the base layer, and rolling a decorative layer on top of the adhesive.

Another aspect of the present disclosure provides a method of forming a luxury vinyl tile. The method comprises: treating a base layer with a primer, and after treating the base layer with the primer, bonding a decorative layer on top of the base layer via a wrapping machine. Bonding the decorative layer on top of the base layer comprises: heating the base layer such that a surface tension of the base layer is increased, applying an adhesive onto a top surface of the base layer, and rolling a decorative layer on top of the adhesive.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DESCRIPTION OF THE INVENTION

Figure 1:
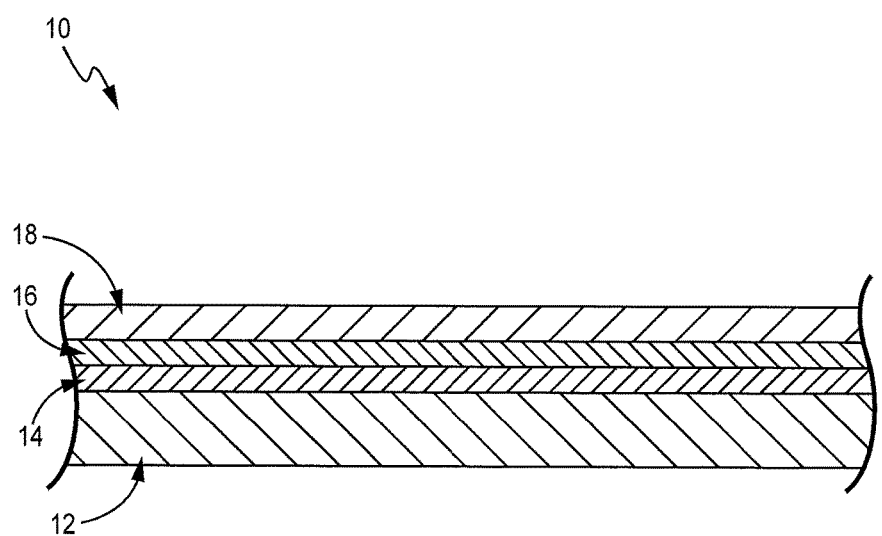
FIG. 1 illustrates a cross sectional view of a flooring component formed using a traditional thermofused lamination process.

The present disclosure provides a new process for manufacturing flooring. In general, the process includes bonding layers to form flooring components using a relatively low temperature process. The process includes providing a base or core layer, and heating the base layer to warm the material and increase its surface tension. In some examples, before heating, the base layer is treated with a primer. Increasing the surface tension of the base layer facilitates bonding and eliminates the need for high temperature fusing currently in use. A decorative layer is applied in a wrapping process. The wrapping process uses at least one roller to initially stick the decorative material at a center of the base layer. The roller shape or use of a series of successive rollers may be used to spread the material of the decorative layer from the center of the core outwards.

Certain terminology is used in the description for convenience only and is not limiting. The words "top," "bottom," "upper," "lower," "bottommost," "topmost," "above," and "below" designate directions in the drawings to which reference is made. The term "substantially" is intended to mean considerable in extent or largely but not necessarily wholly that which is specified. The terminology includes the above-listed words, derivatives thereof and words of similar import.

FIG. 1 illustrates a cross sectional view of a flooring component 10 formed using a traditional lamination process. The flooring component 10 includes a base film or rigid sheet 12, a cross band film 14, a gravure print film layer 16, and a clear film wear layer 18. The base film 12 is provided in relatively large sheets compared to the planks typically used in flooring. The flooring component 10 is formed by stacking cross band film 14 on top of the base film 12, the gravure print film layer 16 on top of the cross band film 14, and the wear layer 18 on top of the gravure print film layer 16. The layers are fused together with high heat (e.g. greater than 350° F.) and with high pressure to form a laminate sheet. As a consequence of the high heat and pressure used, the sheet is prone to localized warping and curling. Also, since the sheet has a dimension much greater than the desired flooring component planks, the sheet must be cut down to desired widths. Typical plank widths vary from 2.5 inches to about 7 inches for most flooring applications. This additional machining increases processing time and cost on a per plank basis. In addition, the gravure print film requires use of specially etched cylinders to apply dyes or ink to form the decorative film. The examples described herein address at least some of the failings found in the traditional process for forming flooring components.

Figure 2:
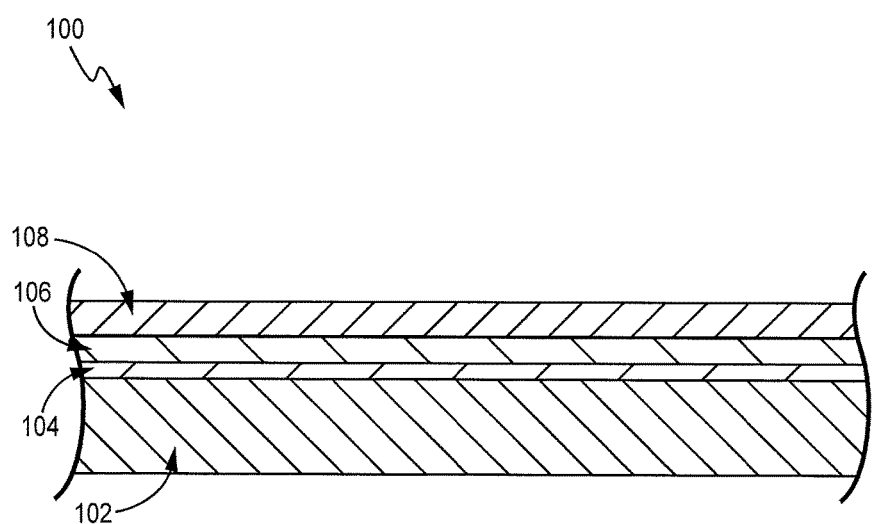
FIG. 2 illustrates a cross sectional view of a first flooring component, according to one example.

FIG. 2 illustrates a cross sectional view of a flooring component 100 manufactured according to the examples described herein. According to the examples, a wrapping process is used in a continuous process that allows material to be supplied in a strip-wise fashion. In this way, the floor component having a desired width may be formed without additional cutting. In the examples, the flooring component 100 includes a base layer 102, an adhesive 104, a decorative layer 106, and an optional wear layer 108. The base layer 102 forms the lowermost layer within the laminated structure of the flooring component 100. Base layer 102 may be constructed of any suitable material in the flooring industry. In the example of a luxury vinyl tile (LVT) flooring component 100, base layer 102 may be formed from a plastic or other polymer based material including but not limited to polyvinylchloride (PVC). The base layer 102 is generally rigid or semi-rigid when used to form a plank, strip, or tile shaped flooring component.

The adhesive 104 is applied to an upper surface of the base layer 102. The adhesive 104 may include, for example, a flexible hot melt polyurethane glue (PUR). Other suitable adhesives may be used depending on the base layer and decorative layer materials. The decorative layer 106 is positioned on top of the adhesive 104, and the wear layer 108 is positioned on top of the decorative layer 106. According to an example, the decorative layer 106 may include, for example, a digital print layer. Digital print layer includes a pattern applied to a suitable substrate using a digital printing process. In one example, described more completely below, the digital print process uses a digital pattern that is applied to the substrate using a laser printing technique. As described above, the wear layer 108 is optional, such that in some examples, a topmost surface of the flooring component 100 comprises the decorative layer 106. The wear layer 108 may include a clear liquid wear layer that is applied as a coating (FIG. 2) or in the form of a separate film that is attached with an adhesive as discussed below.

Figure 3:
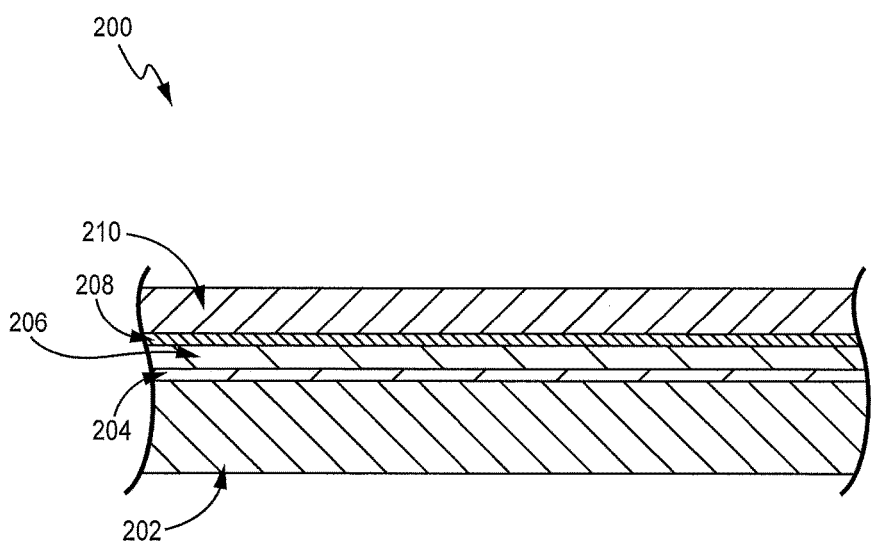
FIG. 3 illustrates a cross sectional view of a second flooring component, according to an another example.

FIG. 3 illustrates a cross sectional view of another example of a flooring component 200 manufactured according to the methods described herein. It will be understood that the examples in FIGS. 2 and 3 contain similar components. Therefore, like numbers have been used to refer to like components when possible. The flooring component 200 includes a base layer 202, a first adhesive 204, a decorative layer 206, a second adhesive 208, and a wear layer 210. The base layer 202 is positioned at a bottommost end of the flooring component 200. The first adhesive 204 is applied to an upper surface of the base layer 202. The first adhesive 204 may include, for example, a flexible hot melt PUR glue. The decorative layer 206 is positioned on top of the first adhesive 204, and may include, for example, a digital print film layer. In this example, flooring component 200 incorporates a solid film wear layer 210 that is attached with an adhesive. In particular, a second adhesive 208 is applied to an upper surface of the decorative layer 206. Adhesive 208 may be any suitable adhesive and may include, for example, a clear PUR glue. The wear layer 210 is positioned on top of the second adhesive 208. The wear layer 210 may include a clear film wear layer.

The depicted example flooring components 100 and 200 should not be considered limiting. It will be appreciated that the flooring components 100 and 200 may include other configurations that have fewer or more layers. As discussed, the wear layer in the examples may be omitted to reduce the number of layers. Additional functional layers may be added to add depth to patterns, provide greater thickness, alter the overall stiffness or rigidity of the floor component or otherwise tailor the laminate structure based on a particular flooring application.

Figure 4:
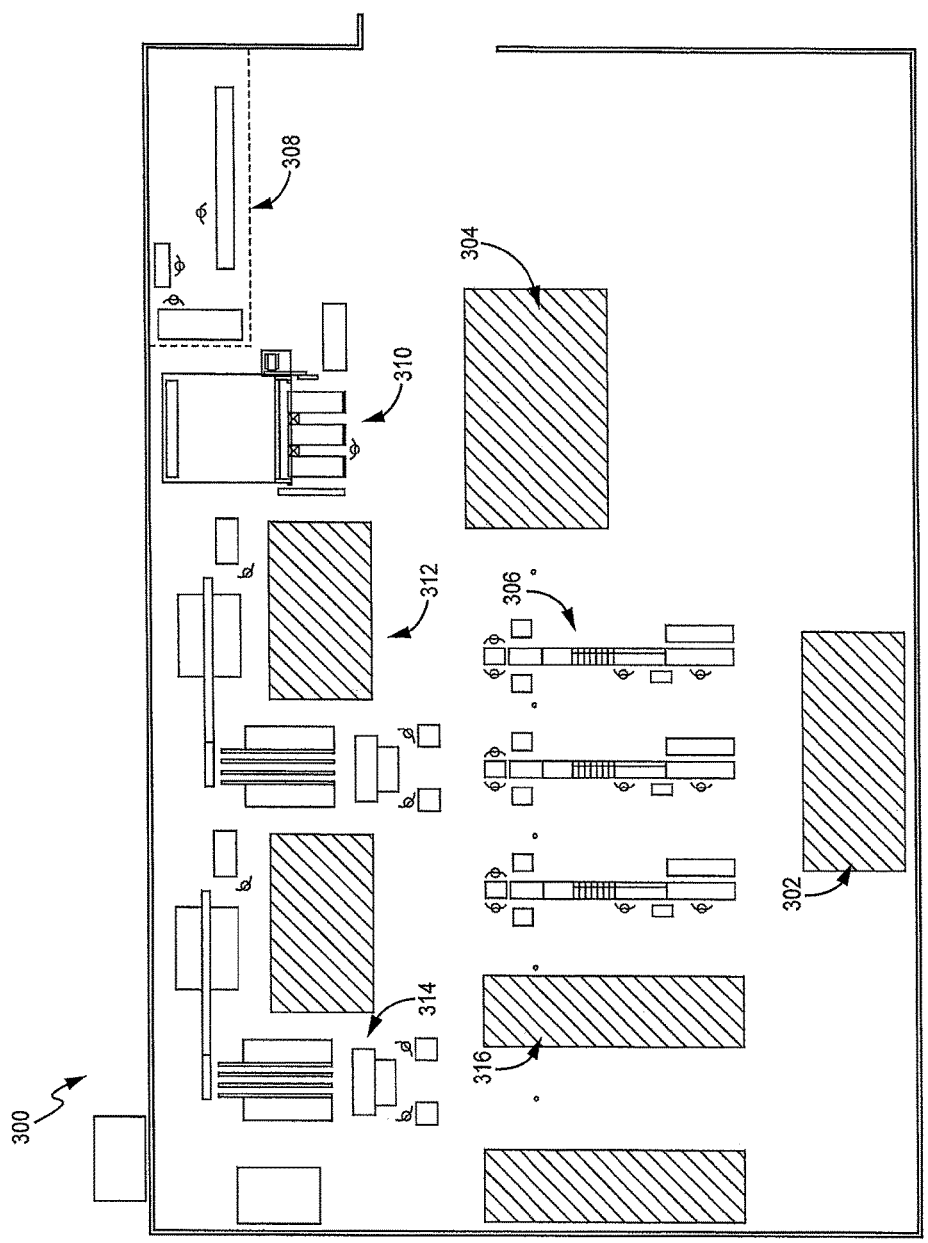
FIG. 4 illustrates a system for manufacturing a flooring component according to an example.
Figure 5:
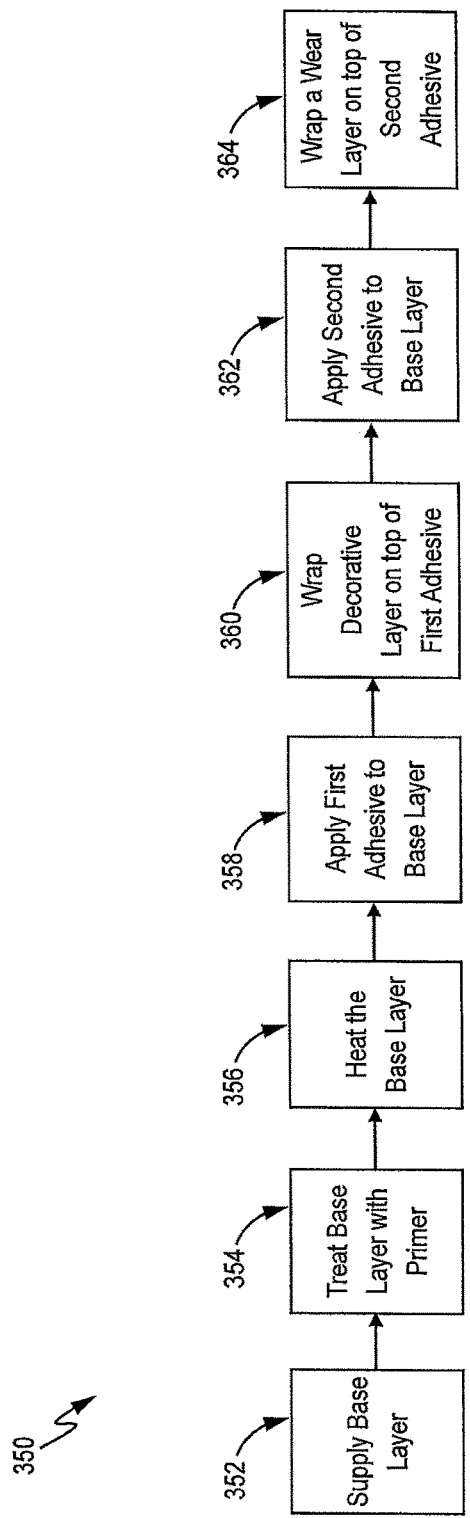
FIG. 5 is a flow diagram of a method of manufacturing a flooring component according to an example.

With reference to FIGS. 4 and 5, one example of a method and system for manufacturing the flooring components, according to the examples described herein, will be described. In the example shown, a flooring component manufacturing system 300 may include a pre-cut staging area 302, a sheet stock storage area 304, first cutting area 306, printing area 308, a second cutting area 310, a pre laminate staging area 312, a boxing and labelling area 314, and a storage rack area 316. The heat, pressure, and humidity within the manufacturing plant 300 is controlled when manufacturing the flooring components 100 and 200.

FIGS. 6 through 20 depict aspects of system 300 in more detail. As shown in FIG. 4, system 300 may include a line or other assembly used to manufacture a flooring component. The line may include a number of systems and machines that are used to build up the laminate product as discussed herein. The description below references the flooring component 200 to describe a manufacturing method 350 shown in FIG. 5; however, it will be appreciated that the method of manufacture may be used to manufacture the flooring component 100 or other flooring components having each of the layers described herein.

Figure 6:
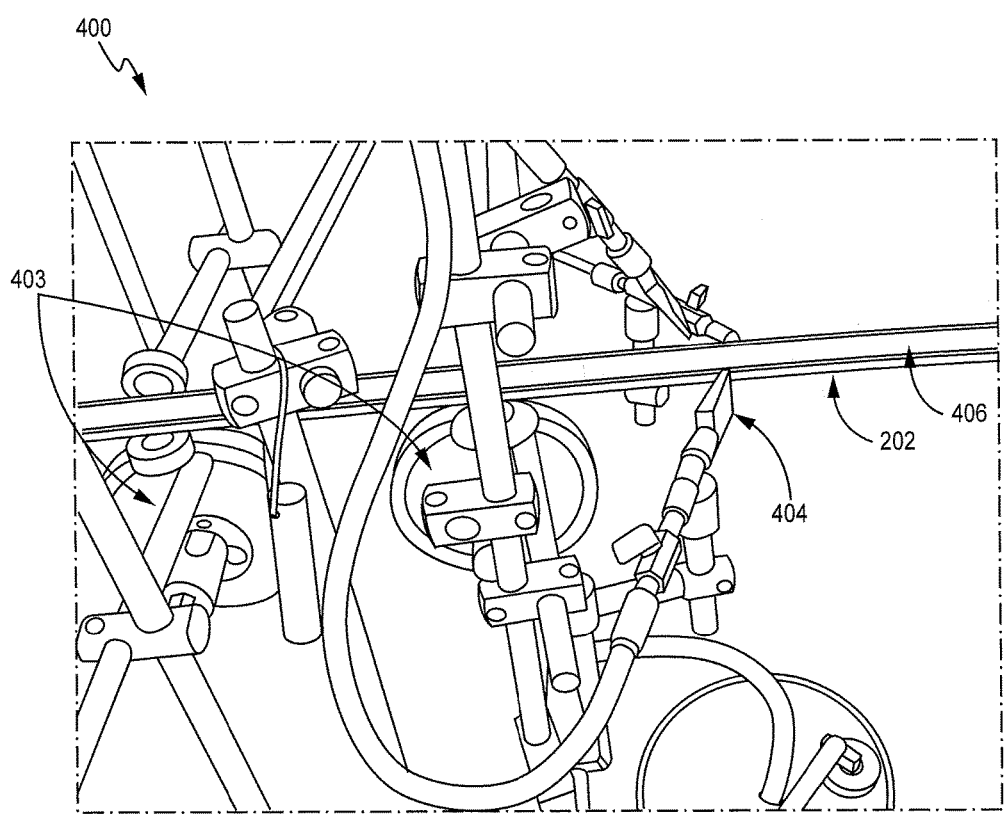
FIG. 6 is a perspective view depicting a system for manufacturing a flooring component according to an example including details of a base layer being treated with a primer.
Figure 7:
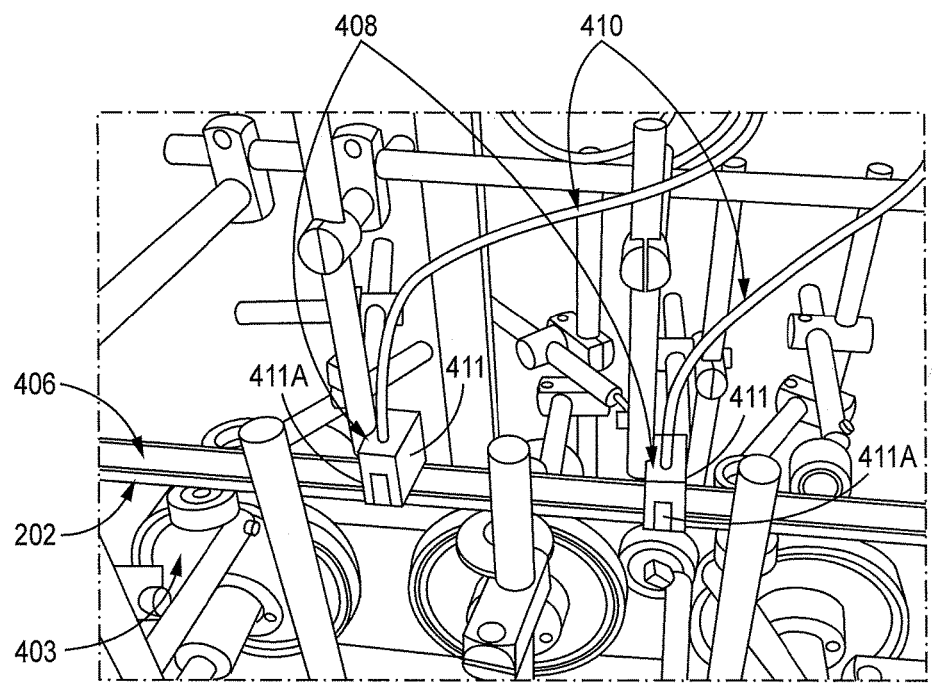
FIG. 7 is a perspective view depicting a system for manufacturing a flooring component according to an example including details of a peristaltic pump and gravity feed for treating a base layer with a primer.

FIG. 6 illustrates the base layer 202 of the flooring component 200 being fed (352) into a system 400 for manufacturing the flooring component 200. In the example, the base layer 202 is a rigid or semi-rigid component and is provided in preformed or pre-cut strips or narrow sheets. The base layer 202 has a thickness, a width and a length. The width may be any width suitable for a flooring application such that after the flooring component is wrapped with the decorative layer, no further cutting is needed to achieve the desired width. Likewise, base layer 202 may be provided in lengths suitable for a flooring application.

To allow piece-wise or continuous feeding of base layer material, system 400 includes a conveyer suitable for transporting the base layer 202. Conveyer may include but is not limited to a belt, air table, shuttle, series of driven rollers or combinations thereof. In the example shown, a conveyer 402 receives base layer 202 and feeds the base layer 402 into the system 400. The conveyor 402 is driven by a series of belt rollers 403. With reference to FIG. 6, system 400 may include fans or blowers 404 to substantially clear off any dust or debris on the base layer 202 as it enters the system 400.

Figure 8:
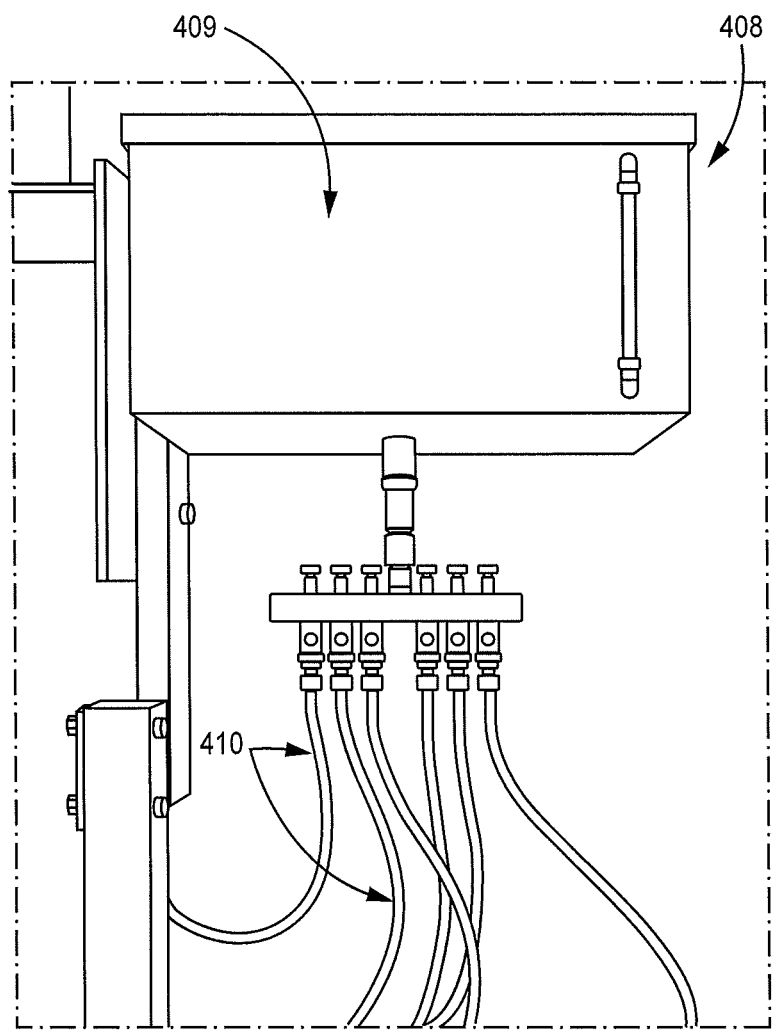
FIG. 8 is a perspective view depicting a system for manufacturing a flooring component according to an example including further details of the primer applicator assembly.

According to an example, base layer 202 may be treated (354) with a primer to facilitate bonding between base layer 202 and adhesive 204. FIG. 6 illustrates the base layer 202 being treated with a primer 406 after debris from the base layer 402 has been substantially cleared off. A primer applicator 408 applies primer as best shown in FIG. 8. Per this example, primer applicator 408 may include a peristaltic pump and gravity feed system 409. The primer 406 from pump may be fed through at least one tube 410 to an applicator head to apply primer to the base layer 402. Applicator head 411 may include an absorbent membrane 411A that becomes saturated with primer and contacts at least a top surface of base layer 202 to apply the primer thereto. It will be understood that one or more primers 406 may be applied to the base layer 402. Primer 406 may be any suitable primer to facilitate adhesion or otherwise improve surface properties of the base layer. According to one example, primer 406 may includes a dry primer heat substrate.

Figure 9:
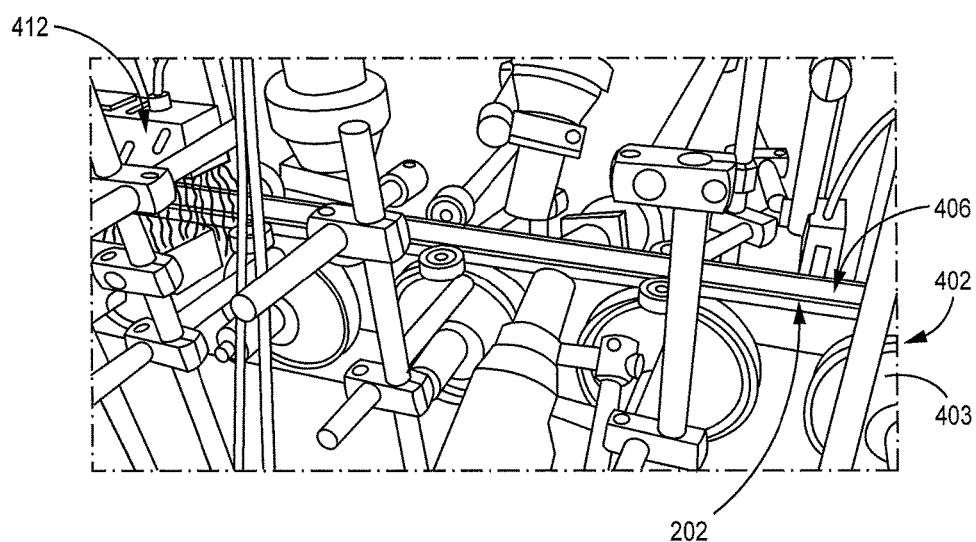
FIG. 9 is a perspective view depicting a system for manufacturing a flooring component according to an example including details of a heating station schematically showing the base layer being warmed to a selected temperature by a heater.
Figure 10:
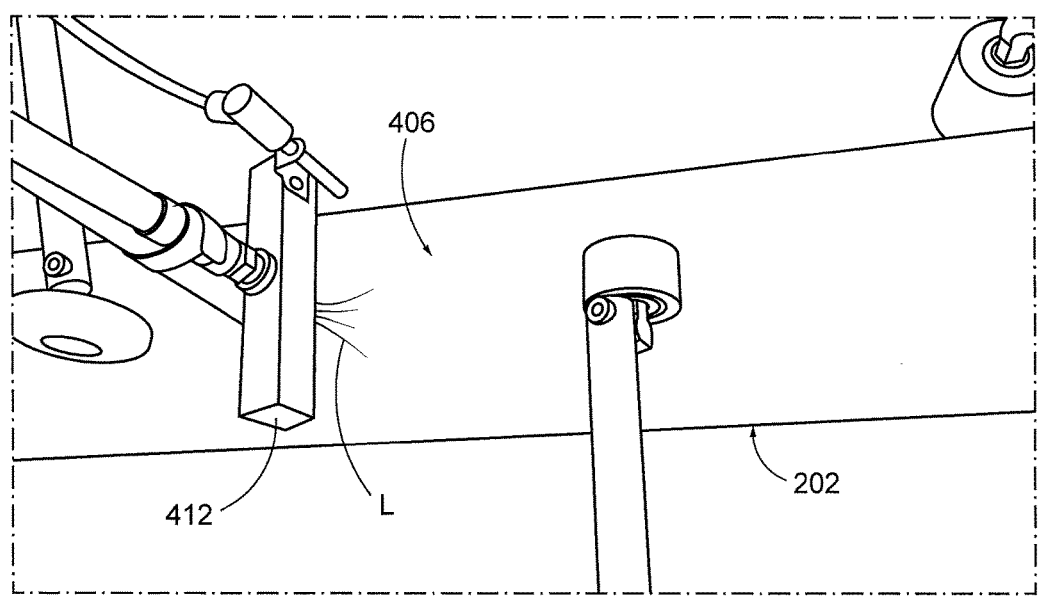
FIG. 10 is a perspective view showing further details of the heating station depicted in FIG. 9.

With reference to FIGS. 9 and 10, after the base layer 202 is treated with the primer 406, the conveyor 402 feeds the base layer 202 into a heater 412 to be heated (356). Heater 412 may be any suitable heater to raise the temperature of base layer 202 as described more completely below. For example, heater 412 may include but is not limited to a flame heating element (FIG. 9), heat saturation lamp employing light L (FIG. 10) or combinations thereof. Heater 412 is used to increase the surface tension within base layer 202 and, when used primer 406. In the example of a PVC base layer 202, an increase in surface tension is obtained at temperatures no greater than about 110° F. Temperatures in the range of about 90° F. to about 110° F. are suitable. A benefit of having a low maximum temperature is that distortion of the base layer is minimized.

Figure 11:
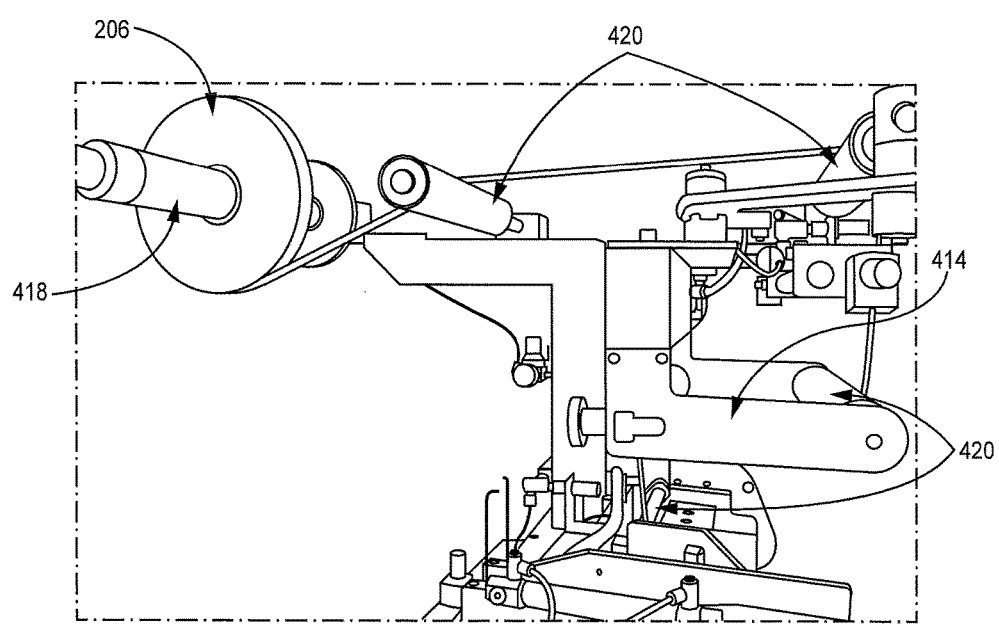
FIG. 11 is a perspective view depicting a system for manufacturing a flooring component according to an example including details of a wrapping machine.
Figure 12:
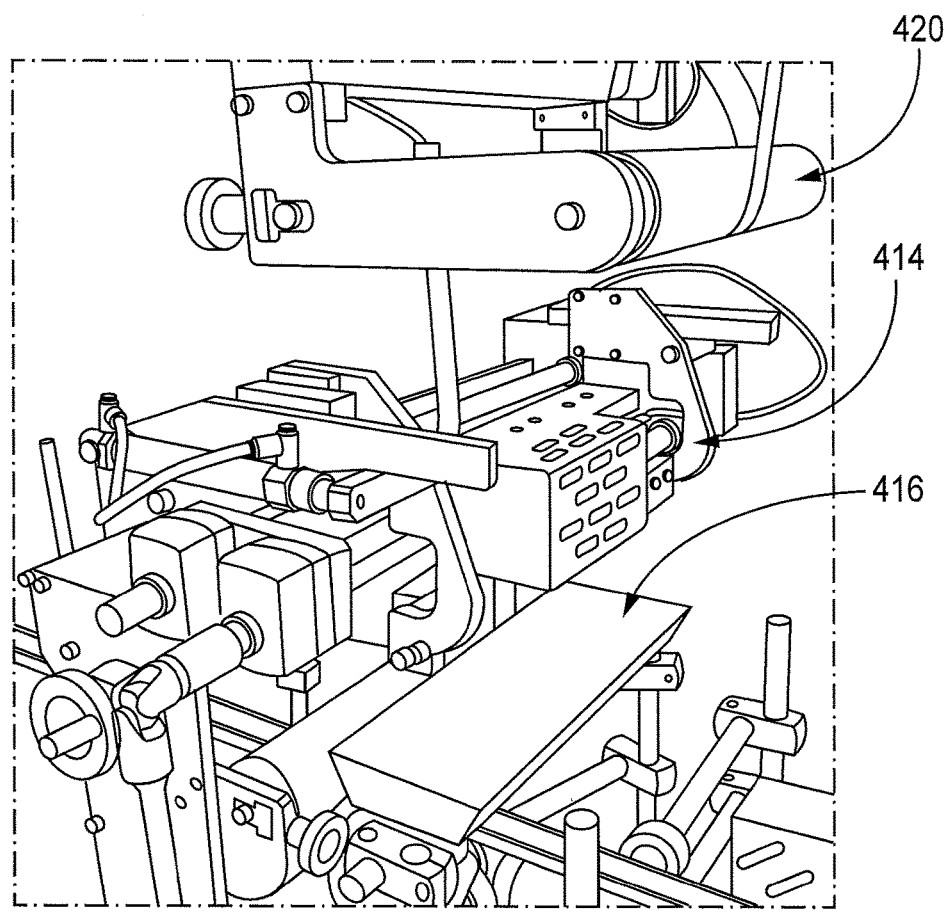
FIG. 12 is a perspective view depicting a system for manufacturing a flooring component according to an example including further details of a decorative layer being applied to the base layer with the wrapping machine.
Figure 13:
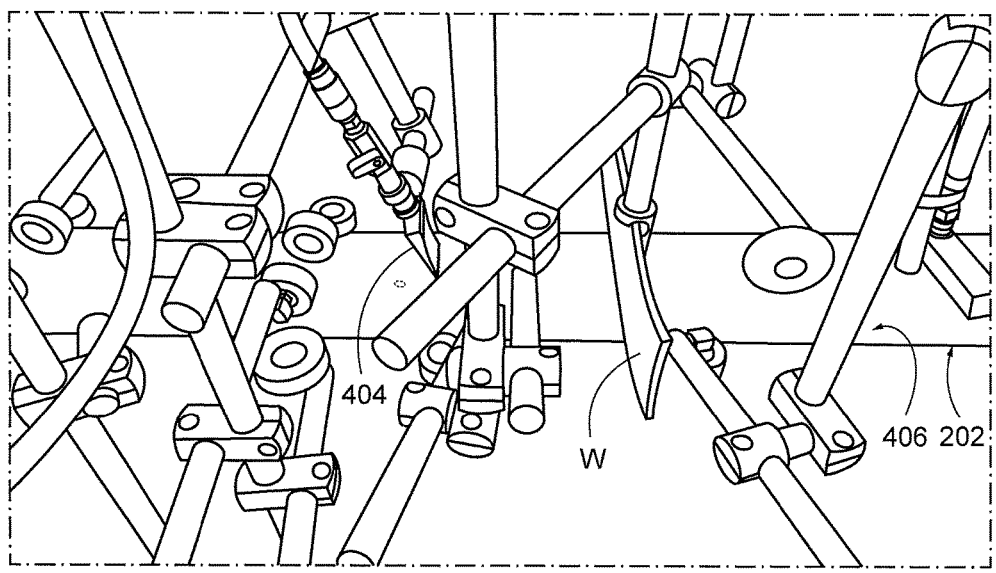
FIG. 13 is a perspective view depicting a system for manufacturing a flooring component according to an example including further details of the wrapping machine.

With reference to FIGS. 11-13, once the base layer 202 and primer 406 have been heated, the conveyor 402 feeds the base layer 202 into a wrapping machine 414. To prepare the base layer 202 for wrapping, as best shown in FIG. 13, a wiper W may be provided to catch any large debris and provide a consistent thickness for adhesive layer. Also, additional fans or blowers 404 may be provided to remove smaller debris downstream of wiper W.

The wrapping machine 414 is configured to receive the base layer 202 therethrough and to apply the first adhesive 204 and the decorative layer 206 onto a top surface of the base layer 202 and the primer 406. The wrapping machine 414 includes an adhesive dispenser 416, a decorative storage roller 418, and a series of wrapping rollers 420. The adhesive dispenser 416 is configured to apply (358) the first adhesive 204 onto the top surface of the base layer 202 and primer 406 as the base layer 202 enters the wrapping machine 414. The decorative storage roller 418 provides the decorative layer 206 to the wrapping machine 414. In an aspect, the decorative storage roller 418 is positioned above the wrapping machine 414. The decorative layer 206 is fed through the wrapping machine 414 on the series of wrapping rollers 420, and is applied (360) to the top of the first adhesive 204, which bonds the decorative layer 206 to the top surface of the base layer 202. The first adhesive 204 acts as a balancing or scrim layer.

Figure 14:
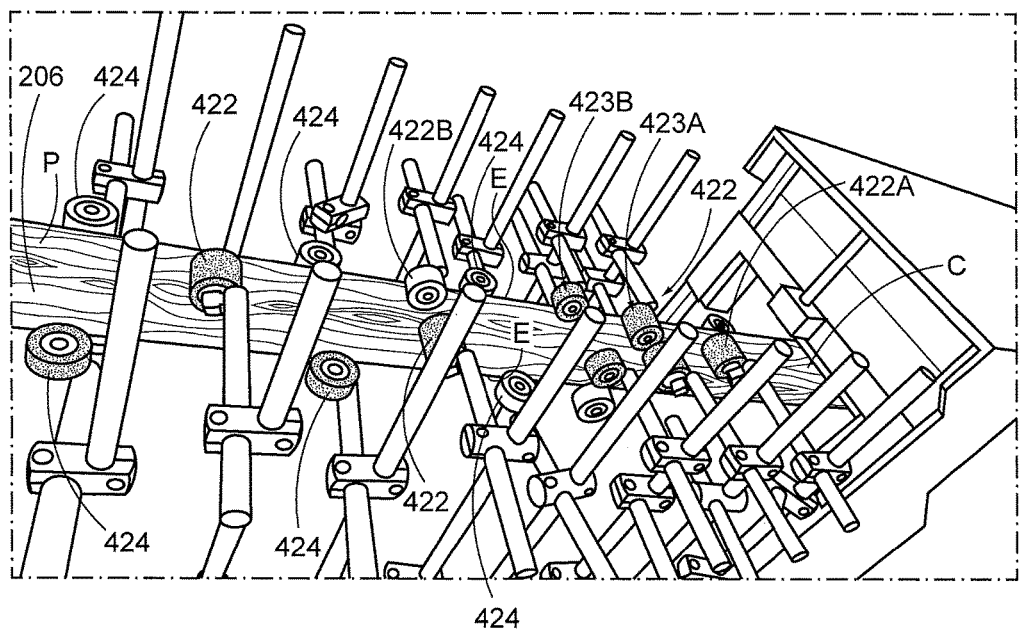
FIG. 14 is a perspective view depicting a system for manufacturing a flooring component according to an example including further details of the wrapping machine.
Figure 15:
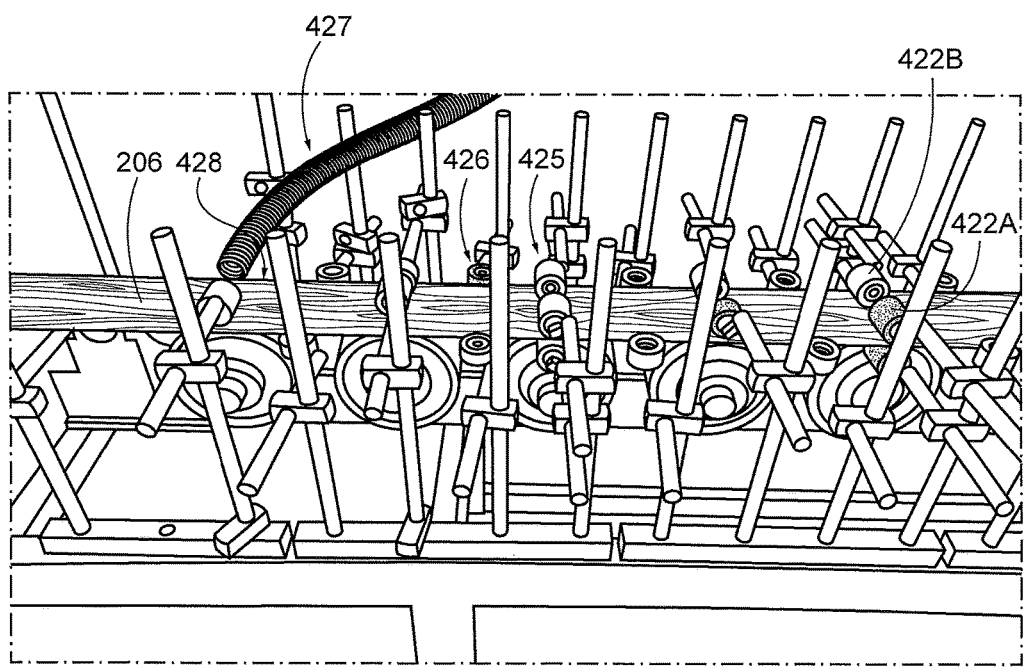
FIG. 15 is a perspective view depicting a system for manufacturing a flooring component according to an example including further details of the wrapping machine.
Figure 16:
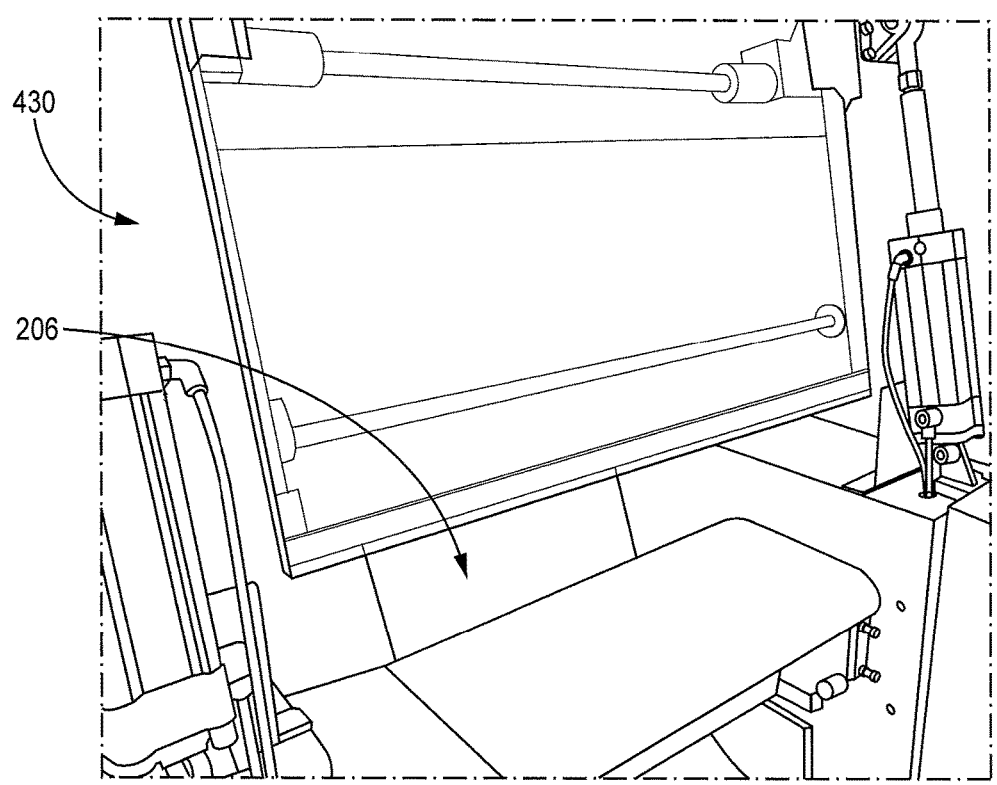
FIG. 16 is a perspective view depicting a system for manufacturing a flooring component according to an example including details of printing a pattern on the decorative layer.

With reference to FIGS. 14-15, once the decorative layer 206 has been applied to the base layer 202, a series of application rollers 422 apply a force to a top surface of the decorative layer 206. The application rollers 422 comprise a series of rollers that may vary in size, shape, position, and hardness. For example, the application rollers 422 may include a first application roller 422A having a first hardness and a second application 422B roller having a second hardness. The first hardness may be different from the second hardness as represented by stipling or lack thereof in the drawing. In the example, first roller 422A has a lower hardness than second roller 422B.

The rollers may be configured in any manner suitable for applying the decorative layer to the adhesive layer. In one example, the application rollers 422 are configured to apply the material of the decorative layer 206 so that it is initially stuck at a center of the base layer 202 and then the rollers 422 progressively apply pressure outward from the center. The outward pressure effectively spreads the decorative layer 206 onto the base layer 202 from the center to an edge of the base layer 202. The use of successive application rollers 422 to spread the adhesion process from inside out substantially avoids trapping bubbles of air as the decorative layer 206 is applied onto the base layer 202. The application of the decorative layer 206 and the subsequent application of force by the application rollers 422 may be referred to as a "wrapping" process (360). Another benefit of the successive application rollers 422 is that they can apply decorative layers 206 onto uneven surfaces. In the example shown in FIG. 14, rollers 422 are configured in a v-formation relative to the feed direction with a roller 422 located centrally relative to the plank to initially apply force to contact the center of the decorative layer to the adhesive layer. Additional rollers are progressively spaced outward from the center downstream of the center roller. In the example, rollers are positioned in pairs and are symmetrically located relative to the center line. It will be understood that the rollers do not need to be placed in pairs and may have offset axes of rotation. In the example, a first pair of rollers 423A is located downstream from first roller 422A and spaced outward from center C yet inward of the edges E of plank. A second pair 423B of rollers 422 are located downstream of the first pair of rollers 423A and spaced further outward from center C than first pair 423A. Second pair of rollers 423A contact the edges E of plank. As with the first pair of rollers 423A, the rollers 422 do not need to be symmetrical and aligned along the same rolling axis as they are shown. In the example all of the rollers 422 in initial v-configuration shown have the same hardness. Downstream of these rollers subsequent rollers maybe use to further wrap the material by applying pressure to the decorative layer to cause it to adhere to the adhesive layer and drive air bubbles from between the layers. For example, edge rollers 424 may apply pressure at the edge of the plank downstream of the v-configuration. In the example, a first pair of edge rollers 424 is provided on either side of plank and aligned with each other to apply equal pressure on opposite sides of the plank in a symmetrical fashion. These rollers 424, as shown, have a second hardness that is greater than the hardness of the v-configured rollers. The axis of rotation of these rollers is perpendicular to the axis of the plank to allow the rollers to roll along the edge of the plank.

Optionally, additional rollers may be used to perform further wrapping of the decorative layer. For example rollers 422 may include a second roller 422B having a second hardness that is greater than the hardness of first roller 422A. Second roller 422B may be offset from center C. Second roller 422B may be paired with a roller 422 having a different length and hardness that is aligned along the same axis. The combination of a harder and softer roller may be useful in facilitating adhesion and driving any air bubbles out from between layers. In the example shown in FIG. 14, harder mater rollers are placed on one side of the center line (top in Fig.) with softer rollers on the other side and at the center. As shown in FIG. 15, as the plank continues downstream, this pattern may be varied with rollers 422,424 of equal hardnesses being paired together at 425 and softer rollers being located at the top with a harder roller at the bottom of the figure at 426. As shown, through out the axial length of each roller may vary. Rollers may have a flat contact area or the contact area may be tapered to one or both sides of the roller to further facilitate the outward driving of air bubbles.

With reference to FIG. 15, once the decorative layer is attached, a vacuum hose 427, or other suction line, may be used to remove any debris, dust, or excess adhesive that may be present. In the example, hose 427 is located generally at the level or slightly above plank P and near one edge thereof. In other examples, hose 427 may be positioned over plank P or multiple hoses a suction head provided to provide greater coverage relative to the plank P. A trimmer 428 may be provided to cut away any excess decorative material from the edge of plank P. A single trimmer 428 is shown on one side for sake of simplicity, but it will be understood that a second trimmer can be used to remove material from the opposite edge of plank P. In the example, trimmer 428 is located upstream relative to vacuum hose 427 to facilitate removal of any excess material that is cut away by vacuum hose 427.

As noted, a wear layer 210 may optionally be applied after the decorative layer 206 is attached. Alternatively, wear layer 210 may be attached to decorative layer 206 after printing, as described below, such that the decorative layer 206 incorporates a wear layer as it is applied to base layer 202.

If a film wear layer 210 is to be applied to the flooring component 200, the flooring component 200 may be put through a second wrapping process. During the second wrapping process, the flooring component 200 travels through the wrapping machine 414 on the conveyor 402. It will be appreciated that a second wrapping machine may be included downstream of the wrapping machine applying the decorative layer to perform the second wrapping process in a continuous fashion. The second wrapping machine may be positioned adjacent to the wrapping machine 414, such that upon exit of the flooring component 200 from the wrapping machine 414, the flooring component 200 enters the second wrapping machine to receive the wear layer 210. The flooring component 200 receives (362) the second adhesive 208 on a top surface of the decorative layer 206. The second adhesive 208 may include a hot melt moisture cure (solid melted to liquid) that cures at an air humidity of, for example, 42%. The wear layer 210 is then applied (364) on top of the second adhesive 208. The wear layer 210 may be applied to the top surface of the decorative layer 206 using a method substantially similarly to the method of applying the decorative layer 206 to the base layer 202 as described above. The application of the wear layer 210 may include using the same application rollers 422, or a second set of application rollers (not shown). The amount of material applied for the wear layer 210 depends on the application of the flooring component 200. The wear layer 210 may be any material capable of improving the wear resistance for the flooring component 200 including but not limited to a film or coating containing aluminum oxide, suitable polymer materials and the like.

Figure 17:
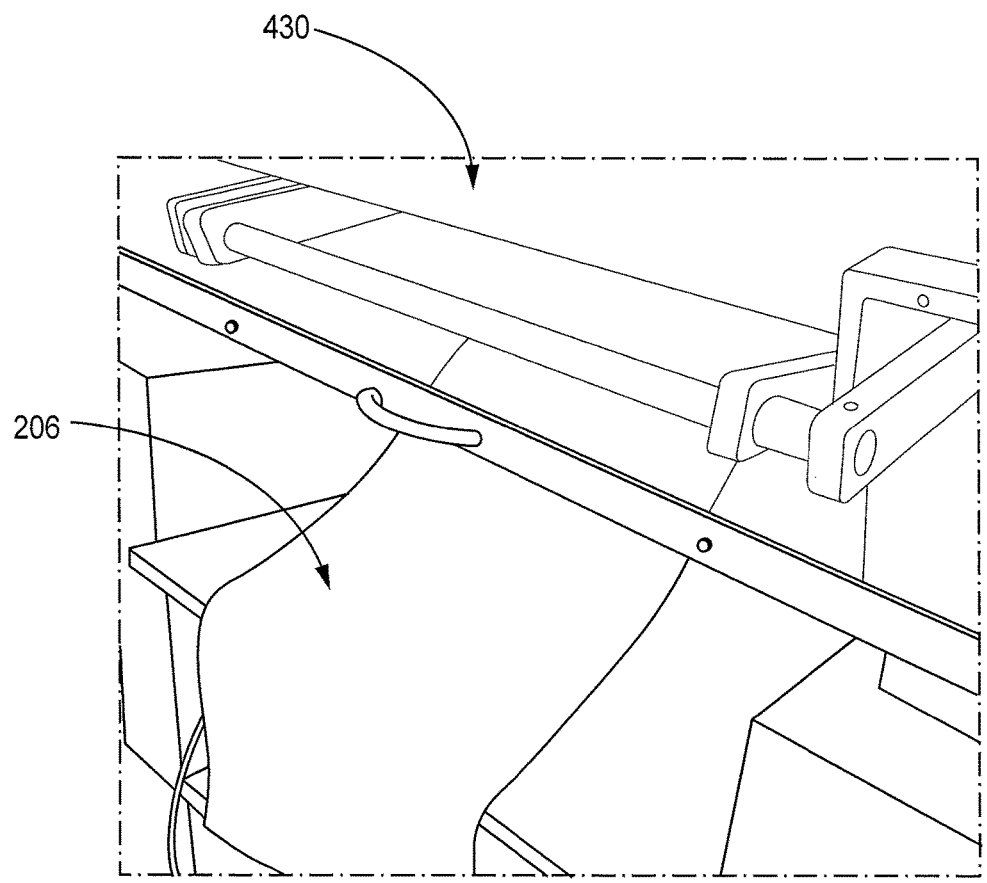
FIG. 17 is a perspective view depicting a system for manufacturing a flooring component according to an example depicting details of a wear resistant layer being applied to the decorative layer.
Figure 18:
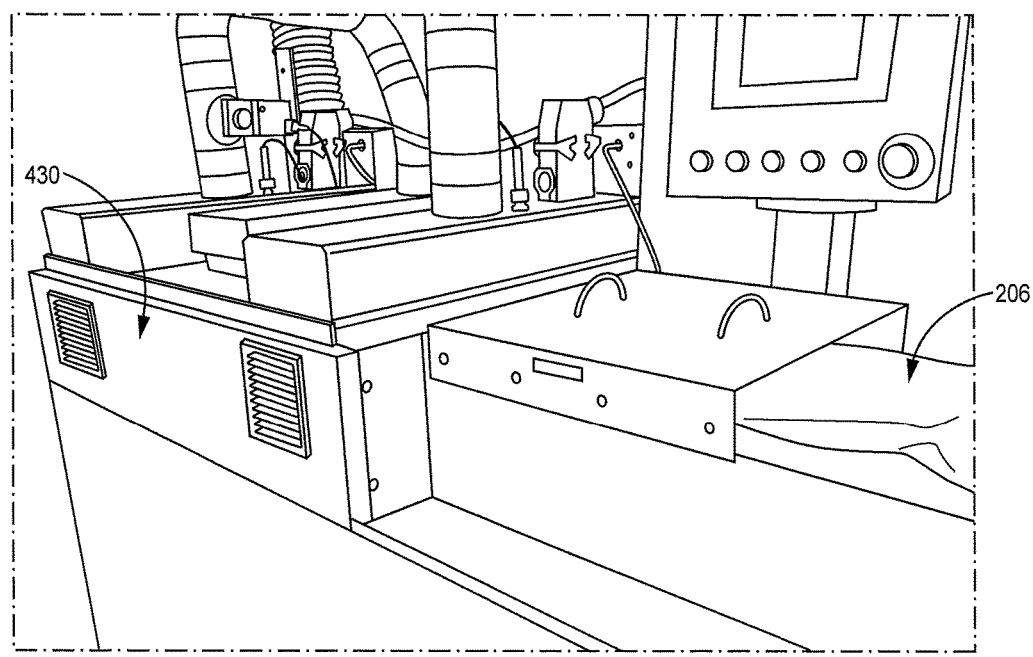
FIG. 18 is a perspective view depicting a system for manufacturing a flooring component according to an example depicting details of a curing station for the wear resistant layer.
Figure 19:
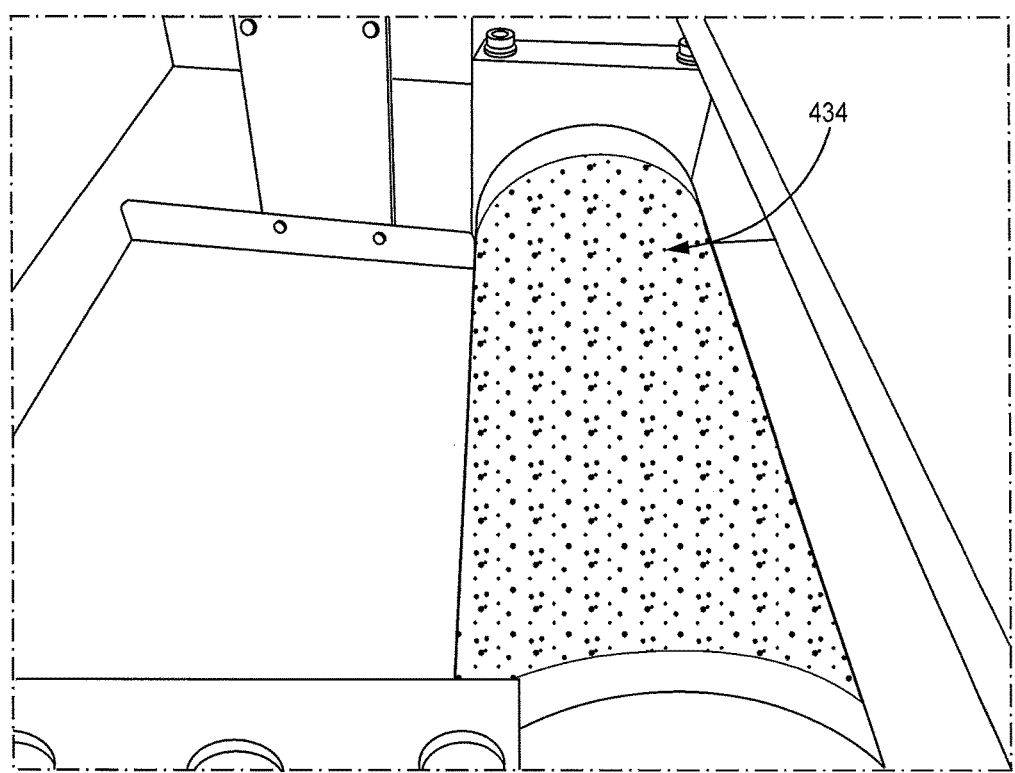
FIG. 19 is a perspective view depicting a system for manufacturing a flooring component according to an example including details of an embossing roller, according to an example applying a texture to at least the wear layer.

According to an example, decorative layer 206 comprises a thin plastic film configured to receive a print (e.g. an image or a design) thereon. The thin plastic film is pre-slit to a predetermined width corresponding to the width of the base layer to which it is applied. In the example, a width of 13 inches or less is used to facilitate printing. It will be understood that other widths may be possible with other printers. Referring to FIGS. 17-19, a printer 430 is configured to apply a desired pattern or image to the thin plastic film or other suitable substrate for forming the decorative layer. The image, pattern, or design applied is limited only by the imagination of the designer and may be digitally stored in memory. Printer 430 may select one of any number of images, designs, patterns or combinations thereof from memory and apply them using a laser printing technique. In the example shown, the printer 430 includes a fixed print head that prints across the entire width of the substrate allow for continuous flow of the substrate past the head. The printer 430 is capable of printing at speeds of up to 150 feet/minute. The substrate may be supplied to the printer in roll form and re-rolled after printing to form a decorative supply roll that is loaded into the wrapping machine (FIG. 11).

In the example shown, a coating station may be provided downstream of the printer to apply a coating to decorative layer 206. For example, the decorative layer 206 may include a top coat that is applied to provide desired properties to wear layer including but not limited to texture, finish, or wear resistance. In one example, wear layer 208 is applied at coating station. The wear layer 208 may include, for example, an ultraviolet curable top coat, a diamond coating (e.g. aluminum oxide), or other coating used to protect the decorative layer 206. When a UV curable coating is use, coating station may include one or more lamps.

As a further option, system may include an embossing roller 434 downstream of printer. With reference to FIG. 20, embossing roller is located downstream of coating station, and is configured to apply a texture within wear layer 208. According to another example, embossing roller may apply the same texture directly to the decorative layer 206. The texture may be added by the embossing roller 434 during the curing process of the wear layer 208. Before rolling the decorative layer up, the wear layer may be allowed to cool following curing. Decorative layer 206 may have any pattern, design or configuration limited only by the imagination of the designer. The example in the figures shows a wood grain decorative layer 206. This example is not limiting. Likewise, the texture applied by the embossing roller 434 may be any texture desired by the designer. In the example, embossing roller 434 provides a texture to wear layer 208 that enhances the appearance of the wood grain decorative layer by simulating fine lines, grooves, and speckled recesses that might be found in a wood product. This example is not limiting.

While the disclosure is described herein using a limited number of embodiments, these specific embodiments are for illustrative purposes and are not intended to limit the scope of the disclosure as otherwise described and claimed herein. Modification and variations from the described embodiments exist. The scope of the invention is defined by the appended claims.

What is claimed is:

1. A system for manufacturing a flooring component, the system comprising:
 a conveyor supplying a base layer;
 a heater configured to heat at least a top surface of the base layer to a temperature no greater than about 110° F. as the base layer moves on the conveyor; and
 a wrapping machine downstream of the heater, the wrapping machine comprising:
  an adhesive dispenser configured to apply an adhesive onto at least the top surface of the base layer as the base layer travels through the wrapping machine, and
  at least one roller configured to apply a decorative layer onto the adhesive to bond the decorative layer to the top surface of the base layer, wherein the at least one roller comprises a first roller and a second roller, wherein a hardness of the first roller is different from a hardness of the second roller.

2. The system of claim 1, wherein the at least one roller includes plural rollers configured to progressively apply the decorative layer from a center of the base layer to an outer edge of the base layer.

3. The system of claim 1, further comprising an engraved roller having a textured pattern thereon, the engraved roller contracting the decorative layer to apply the textured pattern.

4. The system of claim 1, further comprising:
 a digital printer configured to print a decorative pattern onto the decorative layer.

5. The system of claim 1, further comprising:
 a primer station upstream of the heater the primer station applying a primer to at least a top surface of the base layer.

* * * * *